(12) United States Patent
He (10) Patent No.: US 9,524,411 B2
(45) Date of Patent: Dec. 20, 2016

(54) USER-CUSTOMIZABLE DATA CAPTURE TERMINAL FOR AND METHOD OF IMAGING AND PROCESSING A PLURALITY OF TARGET DATA ON ONE OR MORE TARGETS

(75) Inventor: Duanfeng He, South Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1549 days.

(21) Appl. No.: 12/717,330

(22) Filed: Mar. 4, 2010

(65) Prior Publication Data

US 2011/0215154 A1 Sep. 8, 2011

(51) Int. Cl.
G06K 19/06 (2006.01)
G06K 7/10 (2006.01)
G06K 7/14 (2006.01)

(52) U.S. Cl.
CPC ......... *G06K 7/10722* (2013.01); *G06K 7/1443* (2013.01); *G06K 2207/1017* (2013.01)

(58) Field of Classification Search
USPC ................................................. 235/470, 492
See application file for complete search history.

(56) References Cited

U.S. PATENT DOCUMENTS

| | | | |
|---|---|---|---|
| 4,613,895 A | 9/1986 | Burkey et al. | |
| 5,276,742 A | 1/1994 | Dasari et al. | |
| 5,703,349 A | 12/1997 | Meyerson et al. | |
| 6,685,095 B2 | 2/2004 | Roustaei et al. | |
| 7,124,948 B2 | 10/2006 | Longacre, Jr. et al. | |
| 2002/0044689 A1 | 4/2002 | Roustaei et al. | |
| 2002/0125319 A1* | 9/2002 | Sasaki | G06K 19/06009 235/454 |
| 2003/0116628 A1 | 6/2003 | Nakazawa et al. | |
| 2004/0108382 A1 | 6/2004 | Schum et al. | |
| 2007/0278306 A1 | 12/2007 | Brock et al. | |
| 2008/0069398 A1 | 3/2008 | Yamaguchi et al. | |
| 2010/0067807 A1 | 3/2010 | Kim et al. | |
| 2011/0073657 A1 | 3/2011 | Trajkovic et al. | |

(Continued)

FOREIGN PATENT DOCUMENTS

WO 2004066186 A2 8/2004

OTHER PUBLICATIONS

Final Office Action mailed on Oct. 25, 2012 in related U.S. Appl. No. 12/912,831, Duanfeng He, filed Oct. 27, 2010.

(Continued)

*Primary Examiner* — Rafferty Kelly
(74) *Attorney, Agent, or Firm* — Nong-Quiang Fan (57) ABSTRACT

A data capture terminal for, and a method of, processing a plurality of data and a symbol arranged at spaced-apart locations on a target, such as a parcel delivery label, employ a solid-state imager having an array of image sensors for capturing return light from the data and the symbol on the target over a field of view, an actuator for actuating the imager to capture the return light from the data and the symbol on the target in a single actuation, and a controller operatively connected to the actuator and the imager, for processing the return light captured by the imager from the plurality of data and the symbol. The terminal is customized by a user program that advises the controller of user-selected parameters and conditions under which the processing of the return light is to be performed.

17 Claims, 4 Drawing Sheets

(56) References Cited

U.S. PATENT DOCUMENTS

| | | |
|---|---|---|
| 2011/0121077 A1 | 5/2011 | Joseph et al. |
| 2011/0135160 A1 | 6/2011 | Sagan et al. |
| 2011/0240740 A1 | 10/2011 | Li et al. |
| 2012/0104099 A1 | 5/2012 | He et al. |
| 2012/0300258 A1 | 11/2012 | Cong et al. |
| 2013/0094695 A1 | 4/2013 | He et al. |

OTHER PUBLICATIONS

Non Final Office Action mailed on May 30, 2013 in related U.S. Appl. No. 13/272,834, Duanfeng He, filed Oct. 13, 2011.
International Search Report and Written Opinion for related Patent Application No. PCT/US2012/058458 mailed on Feb. 4, 2013.
Final Office Action mailed on Sep. 19, 2013 in related U.S. Appl. No. 13/272,834, Duanfeng He, filed Oct. 13, 2011.
International Search Report and Written Opinion dated Mar. 9, 2011 in related application PCT/US2010/060187.
International Search Report for related Counterpart International Patent Application No. PCT/US2011/054220 mailed on Dec. 7, 2011.
Non Final Office Action mailed on Jul. 23, 2012 in related U.S. Appl. No. 12/912,831, Duanfeng He, filed Oct. 27, 2010.
Le, X. D. et al., "Automated Page Orientation and Skew Angle Detection for Binary Document Images," Pattern Recognition, vol. 27, No. 10, pp. 1325-1344, Oct. 1994.

\* cited by examiner

USER-CUSTOMIZABLE DATA CAPTURE TERMINAL FOR AND METHOD OF IMAGING AND PROCESSING A PLURALITY OF TARGET DATA ON ONE OR MORE TARGETS

DESCRIPTION OF THE RELATED ART

Solid-state imaging systems or imaging readers have been used, in both handheld and hands-free modes of operation of data capture terminals, to capture images from targets having diverse types of target data, such as bar code symbols to be electro-optically decoded and read and/or non-symbols to be processed for storage or display. Bar code symbols have different bar and space patterns that are used to represent different characters. Sets of these patterns are grouped together to form a symbology. There are many types of bar code symbologies, each having their own special characteristics and features. Most symbologies are designed to meet the needs of a specific application or industry. One omnipresent symbology is the Universal Product Code (UPC), which is comprised of a linear arrangement of bars and spaces (each termed as an element) of various widths that, when decoded, uniquely identify a product and its manufacturer. Other symbologies include, by way of non-limiting example, Code 128, Interleaved 2 of 5, Discrete 2 of 5, IATA 2 of 5 and MSI. Non-symbols can include any person, place or thing, especially an alphanumeric address and a signature or seal that signifies receipt and acceptance of a transaction, such as a parcel delivery. Both symbols and non-symbols can be found at different locations on a single target, such as a parcel delivery label.

The imaging reader includes a solid-state imager having an array of photocells or light sensors, which correspond to image elements or pixels in a field of view of the imager, an illuminating light assembly for illuminating the field of view with illumination light from an illumination light source, e.g., a laser or one or more light emitting diodes (LEDs), and an imaging lens assembly for capturing return ambient and/or illumination light scattered and/or reflected from the target data being imaged over a range of working distances. Such an imager may include a one- or two-dimensional charge coupled device (CCD) or a complementary metal oxide semiconductor (CMOS) device and associated circuits for producing electronic analog signals corresponding to a one- or two-dimensional array of pixel information over the field of view. The imager is analogous to the imagers used in electronic digital cameras.

When the target data is a symbol, signal processing circuitry including a digitizer is used for digitizing the analog signal, and a programmed microprocessor or controller is used for processing and decoding the digitized signal based upon a specific symbology used for the symbol. When the target data is a non-symbol, the signal processing circuitry will typically de-skew the captured image, re-sample the captured image to be of a certain size, enhance the quality of the captured image, and compress the captured image prior to transmission to a memory or a remote host.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

It is desirable in many applications, especially in the parcel delivery field, for the data capture terminal to image multiple target data of different types, including one or more symbols of the same or different symbologies, one or more alphanumeric text addresses of an addressor or an addressee of a parcel, a handwritten signature or a stamped seal that signifies receipt and acceptance of delivery of the parcel, and a picture indicative of the delivery. All of this data are arranged at spaced-apart different locations or areas on a target, such as a parcel delivery label or form. Different types of labels can arrange this data at different locations or areas unique to each label.

An operator of a data capture terminal of the prior art has to successively aim the terminal at each piece of data in its turn and to manually pull a trigger to initiate imaging of each piece of data. A new operator, when presented with a label having multiple data types, will be unsure of which data type to read first, and in what order and, hence, must be trained. Regardless of training, multiple trigger pulls are required to complete the imaging of a single label bearing multiple data. This is time-consuming and error prone. It would be desirable to reduce the training and operational burden imposed on the operators of known terminals and to enhance the productivity of such terminals.

In addition, the known terminals of the prior art have a fixed operational configuration set by the manufacturer. It would be further desirable for users or purchasers of such terminals to customize their terminals after delivery from the manufacturer. For example, one user may wish to capture data in a certain order only from certain locations of a particular type of label, or may wish to capture only certain data from different types of labels. Another user may have totally different requirements for capturing different data in a different order from a different label or types of labels. Any particular user's requirements may change over time. Labels may be changed over time. Yet, the fixed configuration of the known terminals does not allow the user to meet such changing requirements without having to send the terminals back to the manufacturer for reconfiguration, with undesirable concomitant delays and service interruption.

SUMMARY OF THE INVENTION

One feature of the present invention resides, briefly stated, in a data capture terminal for imaging and processing a plurality of data of different types, including a symbol having a known symbology, and/or one or more alphanumeric text addresses of an addressor or an addressee of a parcel, and/or a handwritten signature or a stamped seal that signifies receipt and acceptance of delivery of the parcel, and/or a picture indicative of the delivery. All of this data are arranged at spaced-apart different locations on a single target, such as a parcel delivery label or form.

The terminal includes a solid-state imager having an array of image sensors for capturing return light from the plurality of data, including the symbol, on the target over a field of view. Preferably, the imager is a CCD or a CMOS with a rolling or a global shutter. The array may be one-dimensional, i.e., linear arranged along a single row, or two-dimensional having mutually orthogonal multiple rows and columns. Preferably, an actuator, such as a manually depressable trigger, is provided on the terminal for actuating the imager to capture the return light from the plurality of data on the target in a single actuation or trigger pull.

The terminal also includes a microprocessor or controller operatively connected to the actuator and the imager, and is programmed with a terminal program for processing the return light captured by the imager from the plurality of data, including the symbol, preferably in response to the single actuation. In accordance with this invention, the terminal is customized by a user program that advises the controller of user-selected parameters and conditions under which the processing of the return light is to be performed. The terminal program interprets the user program, and advises the controller of such user-selected parameters and conditions in order to determine the spaced-apart locations at which the plurality of data is to be captured from the processed symbol.

More particularly, the symbol has a known characteristic, e.g., a known symbology, a known number of characters or elements, a known orientation, a known scale, etc., and occupies a known symbol location, preferably of rectangular area, on the target. The plurality of data includes a receipt acknowledgment contained in a receipt area, preferably of rectangular shape, on the target, and an alphanumeric address contained in an address area, also preferably of rectangular shape, on the target. The user program configures the controller to be operative for determining whether the processed symbol has said known characteristic or a combination of said characteristics, and for locating the coordinates and the size of the receipt area and of the address area based on the known symbol location of the symbol when the processed symbol has said known characteristic or combination of said characteristics. Once the receipt and address areas are determined, the controller is operative for processing the receipt acknowledgment in the receipt area, and for processing the address in the address area.

The coordinates and the size of the receipt area and of the address area relative to the known symbol location are selected by the user and uploaded via the user program to a memory accessible by the controller prior to data capture. The controller is configured for processing the return light captured by the imager from the plurality of data in a predetermined order, i.e., which data is processed first, second, and so on, also selected by the user and uploaded to the controller prior to data capture. The controller is configured for transmitting the processed return light captured by the imager from the plurality of data away from the controller after all the data is captured.

Thus, an operator of the terminal of this invention does not successively aim the terminal at each piece of data in its turn, nor manually pull a trigger to initiate reading of each piece of data. This minimizes errors and the time needed to read all the data. The operator need not be trained as to which data type to read first, and in what order. A single trigger pull initiates the reading of all the data on a single label in a so-called "single-point-and-shoot multiple data capture" mode of operation. The burden imposed on the operator is reduced and the productivity of the terminal is enhanced.

In addition, users or purchasers of such terminals can now customize their terminals after delivery from the manufacturer with the aforementioned parameters and conditions to capture multiple data in any desired order from any desired locations on any desired type of label or labels to satisfy the user's changing requirements, thereby avoiding the prior art drawback of having to send the terminals back to the manufacturer for customized reconfiguration, with undesirable concomitant delays and service interruption.

Another feature of the present invention resides in a method of processing a plurality of data and a symbol arranged at spaced-apart locations on a target, which is performed by capturing return light from the plurality of data and the symbol on the target over a field of view of an imager, actuating the imager to capture the return light from the plurality of data and the symbol on the target, processing the return light captured by the imager from the data, including the symbol, with a controller, and customizing the controller with user-selected parameters and conditions under which the processing of the return light is to be performed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
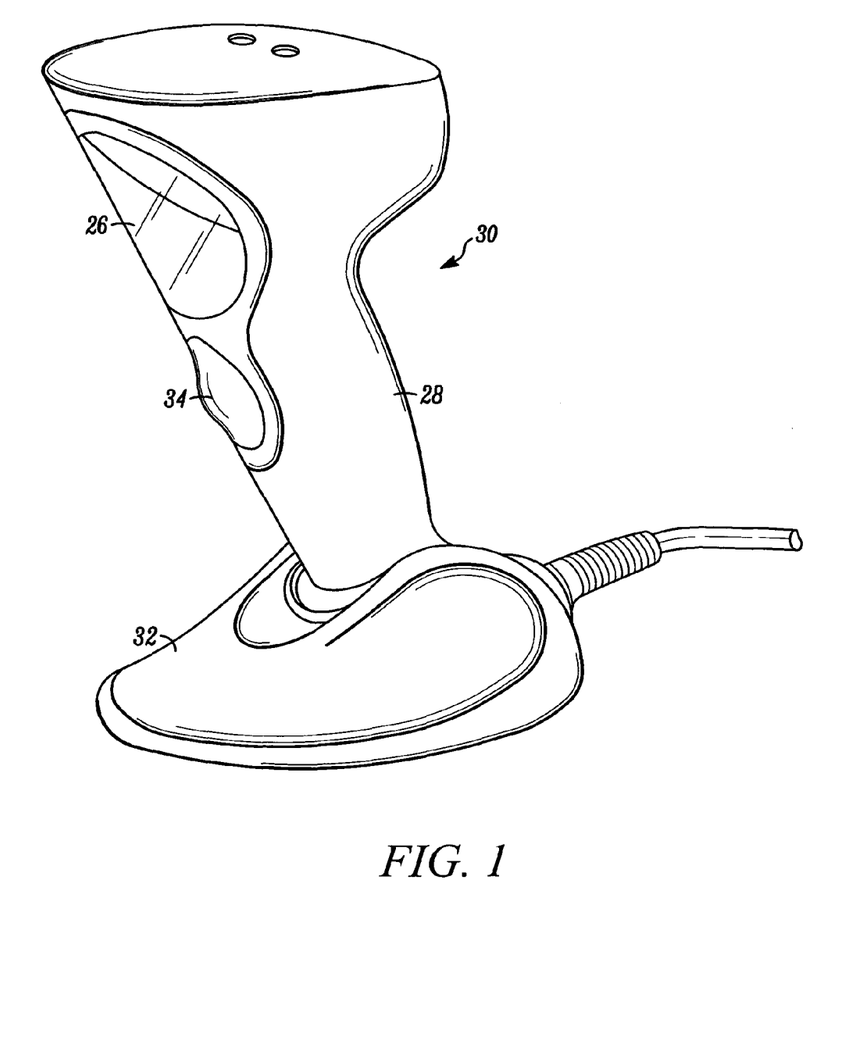
FIG. 1 is a perspective view of a portable data capture terminal operative in either a handheld mode, or a hands-free mode, for capturing return light from target data.

Reference numeral 30 in FIG. 1 generally identifies a data capture terminal having a generally upright window 26 and a gun-shaped housing 28 supported by a base 32 for supporting the terminal 30 on a countertop. The terminal 30 can thus be used in a hands-free mode as a stationary workstation in which a target is slid, swiped past, or presented to, the window 26, or can be picked up off the countertop and held in an operator's hand and used in a handheld mode in which the terminal is moved, and a trigger 34 is manually depressed to initiate imaging of target data, especially one or more symbols of the same or different symbologies, and/or one or more alphanumeric text addresses of an addressor or an addressee of a parcel, and/or a handwritten signature or a stamped seal that signifies receipt and acceptance of delivery of the parcel, and/or a picture indicative of the delivery, as described below and illustrated in FIG. 3, to be read at a distance from the window 26. In another variation, the base 32 can be omitted, and housings of other configurations can be employed. A cable, as illustrated in FIG. 1, connected to the base 32 can also be omitted, in which case, the terminal 30 communicates with a remote host by a wireless link, and the terminal is electrically powered by an on-board battery.

Figure 2:
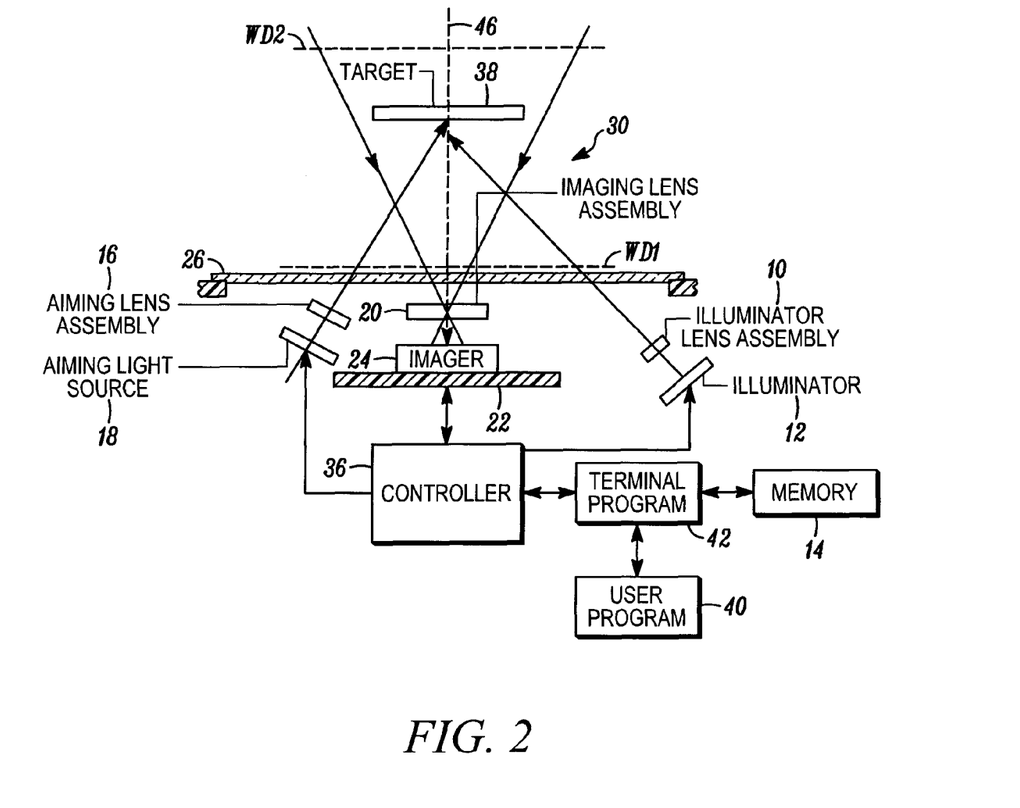
FIG. 2 is a schematic diagram of various components of the terminal of FIG. 1.

As schematically shown in FIG. 2, an imager 24 is mounted on a printed circuit board 22 in the terminal. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from the data on a target 38 as pixel data over a two-dimensional field of view. The imaging lens assembly 20 is operative for adjustably focusing the return light onto the array of image sensors to enable the data on the target 38 to be imaged. The target 38 is located anywhere in a working range of distances between a close-in working distance (WD1) and a far-out working distance (WD2). In a preferred embodiment, WD1 is about four to six inches from the imager array 24, and WD2 can be over one foot away from the window 26.

An illuminating assembly is also preferably mounted in the terminal and preferably includes an illuminator or illuminating light source 12, e.g., a light emitting diode (LED) or a laser, and an illuminating lens assembly 10 to uniformly illuminate the data on the target 38 with an illuminating light having an intensity level over an illumination time period. The light source 12 is preferably pulsed.

An aiming assembly is also preferably mounted in the imaging terminal and preferably includes an aiming light source 18, e.g., an LED or a laser, and an aiming lens assembly 16 for generating a visible aiming light pattern on the target 38. The aiming pattern is useful to help the operator accurately aim the terminal at the target 38.

As shown in FIG. 2, the imager 24, the illuminating light source 12 and the aiming light source 18 are operatively connected to a controller or programmed microprocessor 36 operative for controlling the operation of these components. Preferably, the controller 36 is operative for processing the return light from the data on the target 38, and for decoding the captured target image when the target data is a bar code symbol, all under the guidance of a terminal program 42. A memory 14 is accessible by the controller 36 for storing the terminal program 42 and for storing and retrieving processed data. In accordance with this invention, the terminal is customized by a user program 40 that advises the controller 36 of user-selected parameters and conditions under which the processing of the return light is to be performed. The terminal program 42 interprets the user program 40, and advises the controller 36 of such user-selected parameters and conditions in order to determine the spaced-apart locations at which the plurality of data is to be captured from the processed symbol. The user program 40 is uploaded to, and stored in, the memory 14 prior to data capture.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
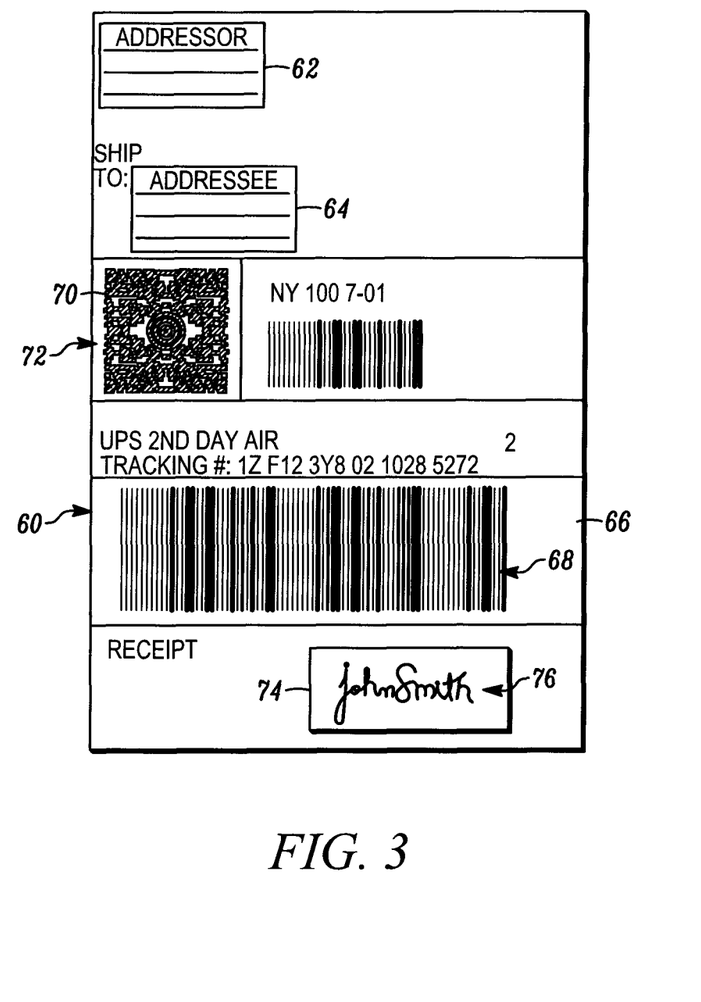
FIG. 3 is a view of a parcel delivery label depicting such target data as bar code symbols, a receipt acknowledgment, and alphanumeric text addresses to be captured by the terminal of FIG. 1.

As shown in FIG. 3, one preferred embodiment of the target 38 is a parcel delivery label 60 that includes, among other things, an addressor area 62, preferably of rectangular shape, in which addressor data in alphanumeric text of a parcel to be delivered is identified, an addressee area 64, also preferably of rectangular shape, in which addressee data in alphanumeric text of the parcel is identified, a symbol area 66, also preferably of rectangular shape, in which a datum or symbol 68 having a specific symbology, e.g., Code 128, and indicative of a tracking number for the parcel, is located, another symbol area 70 in which a different datum or symbol 72 having a different symbology is located, and a receipt acknowledgment area 74, also preferably of rectangular shape, in which a datum or receipt acknowledgment 76 in pictoral form, such as a handwritten signature or a stamp/seal, is entered upon delivery of the parcel. The data are arranged at the illustrated spaced-apart locations or areas on the label 60.

In accordance with this invention, the user program 40 modifies and customizes the operation of the controller 36. After the controller 36 processes the return light captured by the imager 24 from the plurality of data, including one of the symbols, e.g., symbol 68, preferably in response to a single actuation of the trigger 34, the controller 36 now knows whether, when and where to look for the spaced-apart locations 62, 64, 70, 74 on the target 60, based on the processing of the processed symbol 68.

More particularly, the symbol 68 has a known characteristic, e.g., a known symbology, e.g., Code 128, a known number of characters or elements of different light reflectivity, a known orientation, a known scale, etc., and occupies the known symbol location 66 on the target 60. The plurality of data includes the receipt acknowledgment 76 contained in the rectangular receipt area 74 on the target, the other symbol 72 contained in the other symbol area 70, and the alphanumeric addresses contained in the rectangular address areas 62, 64 on the target 60. The controller 36 is customized by the user program 40 for determining whether the processed symbol 68 has said known characteristic or a combination of said characteristics, and for responsively locating the coordinates and the size of the receipt area 74, the other symbol area 70, and of the address areas 62, 64 based on the known symbol location 66 of the symbol 68 when the processed symbol 68 has said known characteristic or the combination of said characteristics. The controller 36 is further operative for processing the receipt acknowledgment 76 in the receipt area 74, and/or for processing the other symbol 72 in the other symbol area 70, and/or for processing the addresses in the address areas 62, 64, if the user program 40 so commands.

The coordinates and the size of the receipt area 74, of the other symbol area 70, and of the address areas 62, 64 relative to the known symbol location 66 are selected by the user and uploaded to the controller 36 via the user program 40 prior to data capture. The controller 36 is configured for processing the return light captured by the imager 24 from the plurality of data in a predetermined order, i.e., which data is processed first, second, and so on, also selected by the user and uploaded to the controller 36 via the user program 40 prior to data capture. The controller 36 is configured for transmitting the processed return light captured by the imager 24 from the plurality of data away from the controller 36 to, for example, the local memory 14 or a remote host, after all the data is captured.

Configuration of the controller 36 with the location coordinates and size and direction parameters of the various areas and/or symbology parameters and/or signature/seal capture parameters and/or optical character recognition parameters is performed by the controller under the control of the user program 40. For example, the location parameters of the rectangular symbol area 66 can be defined by x, y coordinates of one of its corners or of a center of the symbol 68. Then, the other areas 62, 64, 70, 74 can be located by defining an offset vector for each respective area, as well as a width dimension and a length dimension for each respective area. The symbology parameters can be configured to accept only one or more or all symbologies. The signature/seal capture parameters can be configured to accept images in a certain image format, e.g., jpeg or bitmap.

Figure 4:
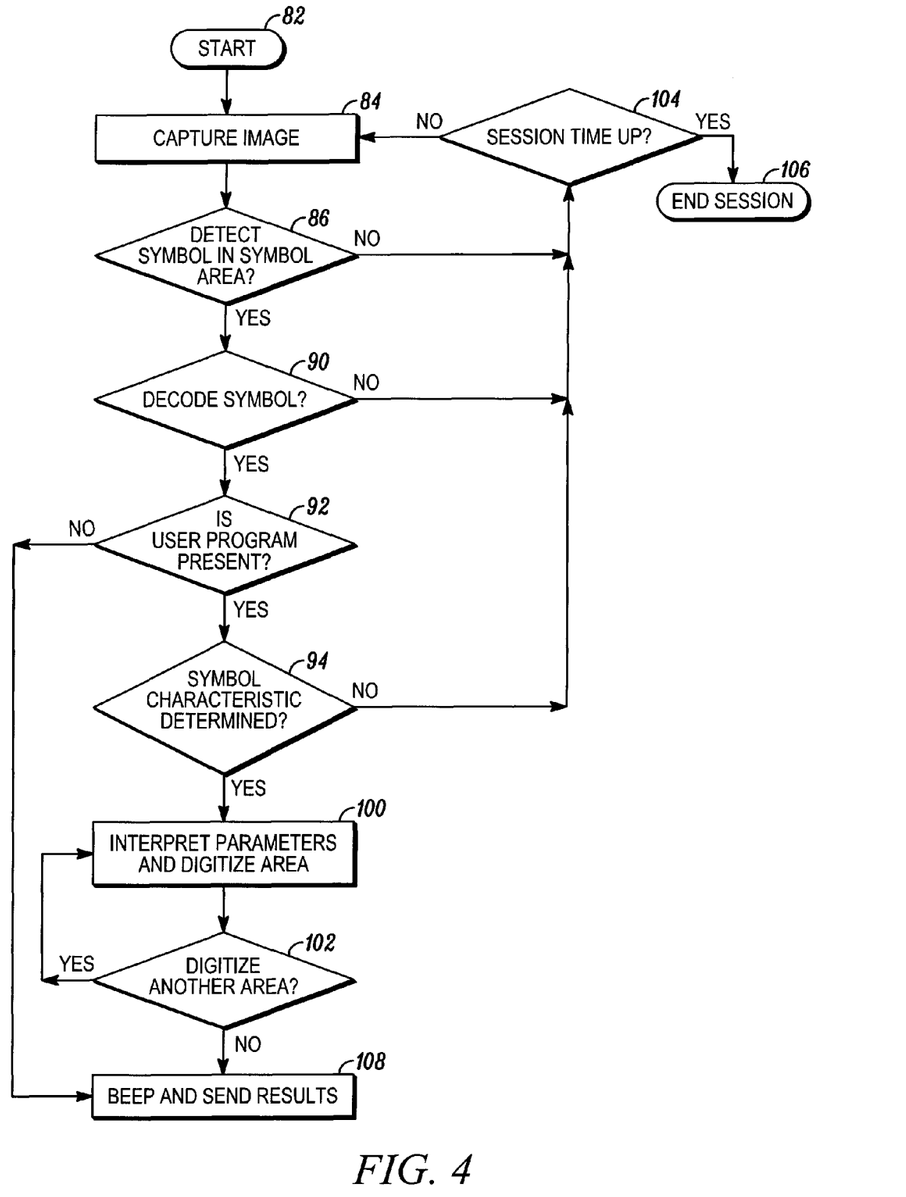
FIG. 4 is a flow chart explaining operation of the terminal of FIG. 1 in accordance with this invention.

FIG. 4 is a flow chart depicting the method of this invention. Starting at start step 82, the programmed controller 36 is operative at step 84 for capturing an image of all the target data on the label 60. At step 86, the controller 36 is operative for detecting the symbol area 66 on the label 60, and whether the symbol 68 is in this detected area 66. If so, then the controller 36 is operative for decoding the symbol 68 at step 90. Once the symbol 68 has been decoded, the controller 36 determines at step 92 whether the user program 40 is present. If not, then the controller 36 transmits all the decoded and processed data away from the controller 36, and a beep or other indicator is generated at step 108.

If the user program 40 is present, then the controller 36 determines at step 94 whether the symbol 68 has a specific known symbology, e.g., Code 128, or some other known characteristic or combination of characteristics, using the user-selected parameters and conditions, i.e., software logic, included in the user program 40. If so, then the terminal program 42 of the controller 36 interprets the user program 40 and uses the user-selected parameters and conditions to locate the address areas 62, 64 and/or the receipt acknowledgment area 74 on the label 60, and for digitizing and processing the contents of these areas 62, 64, 74 at step 100. Optionally, the controller 36 locates the other symbol area 70 if the controller has also been preprogrammed with the coordinates and size of this other symbol area 70, and checks whether the other symbol 72 is in the other symbol area 70, and digitizes and decodes the other symbol area 70. At step 102, the controller determines from the user program whether another area is to be digitized. If so, then the step 100 is repeated. If not, then once all the data has been captured, the controller 36 transmits all the decoded and processed data away from the controller 36, and a beep or other indicator is generated at step 108.

To repeat, the parameters and logic provided by the user program 40 is interpreted by the terminal program 42, such that coordinate information of areas to be digitized and processed is understood correctly, taking into consideration knowledge of image capture characteristics of the label 60, such as skew, rotation, shift zoom and like characteristics. Furthermore, the interpretation process ensures that the user program 40 cannot lead the controller 36 into doing anything potentially harmful, such as dividing by 0, or accessing non-existing or uninitialized memory 14.

If the controller 36 does not detect or decode the symbol 68 in the designated symbol area 66, or does not determine the symbol characteristic at step 94, then the controller 36 checks at step 104 whether the data capture session time has elapsed. If not, then the controller 36 attempts to capture the image again at step 84. If the time has elapsed, then the controller 36 ends the data capture session at step 106.

It will be understood that each of the elements described above, or two or more together, also may find a useful application in other types of constructions differing from the types described above. For example, this invention is not to be limited solely to detecting the Code 128 symbology as the known specific symbology, or solely to the field of parcel delivery. Also, this invention is not to be limited solely to data capture terminals whose only function is to image bar code symbols, receipt acknowledgments and alphanumeric address text, but could equally well apply to other types of data, as well as to mobile computers, smartphones, or terminals having an imager as one of its subsystems.

While the invention has been illustrated and described as a data capture terminal for, and a method of, processing a plurality of data on a target per single actuation of an actuator, it is not intended to be limited to the details shown, since various modifications and structural changes may be made without departing in any way from the spirit of the present invention. For example, the data need not be on a single target or label, but could equally well be on different labels. Thus, the decoding of the symbol 68 on a particular label 60 can be employed by the controller 36 to not only locate other areas to be processed on the same label, but could also be used to locate additional areas on other different labels.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A data capture terminal for processing a plurality of data areas arranged at spaced-apart locations on a target, comprising:
    a solid-state imager having an array of image sensors for capturing return light from the plurality of data areas each being rectangular in shape and a symbol on the target over a field of view, wherein the symbol has a known characteristic and the plurality of data areas is arranged at the spaced-apart locations in a layout based upon the known characteristic of the symbol;
    an actuator for actuating the imager to capture the return light from the plurality of data areas and the symbol on the target; and
    a controller operatively connected to the actuator and the imager, for processing the return light captured by the imager from the plurality of data areas and the symbol, the controller configured for determining whether the processed symbol has the known characteristic and determining from the processed symbol the spaced-apart locations at which the plurality of data areas is arranged over the field of view when the processed symbol has the known characteristic and locating from the processed symbol coordinates and size of at least two data areas within the plurality of data areas that are spatially separated from the processed symbol located completely outside each of the at least two data areas.

2. The terminal of claim 1, wherein the known characteristic is a known symbology and the symbol occupies a known symbol location on the target; and wherein the controller is configured for determining whether the processed symbol has said symbology, and for locating the spaced-apart locations based on the known symbol location of the symbol when the processed symbol has said symbology.

3. The terminal of claim 1, wherein the plurality of data areas includes at least one of alphanumeric text, a receipt acknowledgment, and a picture.

4. The terminal of claim 1, wherein the controller is configured for transmitting the processed return light captured by the imager from the plurality of data areas away from the controller after all the data is captured.

5. The terminal of claim 1, wherein the symbol has a known symbology and occupies a known symbol location of rectangular area on the target; wherein the plurality of data areas includes a receipt acknowledgment contained in a rectangular receipt area on the target, and an alphanumeric address contained in a rectangular address area on the target; and wherein the controller is configured for determining whether the processed symbol has said symbology, for locating coordinates and size of the receipt area and of the address area based on the known symbol location of the symbol when the processed symbol has said symbology, for processing the receipt acknowledgment in the receipt area, and for processing the address in the address area.

6. The terminal of claim 5, wherein the coordinates and the size of the receipt area and of the address area relative to the known symbol location are the user-selected parameters that are uploaded to the controller prior to data capture.

7. The terminal of claim 1, wherein the controller is configured for processing the return light captured by the imager from the plurality of data areas in a predetermined order prior to data capture.

8. The terminal of claim 1, wherein the actuator is manually operated to capture the return light from the plurality of data areas on the target in a single manual action.

9. A data capture terminal for processing a plurality of data areas and a symbol arranged at spaced-apart locations on a target, comprising:

means for capturing return light from the plurality of data areas each being rectangular in shape and the symbol on the target over a field of view, wherein the symbol has a known characteristic and the plurality of data areas is arranged at the spaced-apart locations in a layout based upon the known characteristic of the symbol;

means for actuating the capturing means to capture the return light from the plurality of data areas and the symbol on the target; and control means for processing the return light captured by the capturing means from the plurality of data areas and the symbol, the control means determining whether the processed symbol has the known characteristic and determining from the processed symbol the spaced-apart locations at which the plurality of data areas is arranged over the field of view when the processed symbol has the known characteristic and locating from the processed symbol coordinates and size of at least two data areas within the plurality of data areas that are spatially separated from the processed symbol located completely outside each of the at least two data areas.

10. A data capture method of processing a plurality of data areas and a symbol arranged at spaced-apart locations on a target, comprising the steps of:

capturing return light from the plurality of data areas each being rectangular in shape and the symbol on the target over a field of view of an imager, wherein the symbol has a known characteristic and the plurality of data areas is arranged at the spaced-apart locations in a layout based upon the known characteristic of the symbol;

actuating the imager to capture the return light from the plurality of data areas and the symbol on the target;

processing the return light captured by the capturing means from the plurality of data areas and the symbol; and customizing the processing step by determining whether the processed symbol has the known characteristic and determining from the processed symbol the spaced-apart locations at which the plurality of data areas is arranged over the field of view when the processed symbol has the known characteristic and locating from the processed symbol coordinates and size of at least two data areas within the plurality of data areas that are spatially separated from the processed symbol located completely outside each of the at least two data areas.

11. The method of claim 10, wherein the known characteristic is a known symbology and the symbol occupies a known symbol location on the target; and wherein the customizing step is performed by determining whether the processed symbol has said symbology, and by locating the spaced-apart locations based on the known symbol location of the symbol when the processed symbol has said symbology.

12. The method of claim 10, wherein the plurality of data areas includes at least one of alphanumeric text, a receipt acknowledgment, and a picture.

13. The method of claim 10, and transmitting the processed return light captured by the imager from the plurality of data areas and the symbol to a remote host after all the data is captured.

14. The method of claim 10, and configuring the symbol with a known symbology and with a known symbol location of rectangular area on the target; wherein the plurality of data areas includes a receipt acknowledgment contained in a rectangular receipt area on the target, and an alphanumeric address contained in a rectangular address area on the target; and wherein the customizing step is performed by determining whether the processed symbol has said symbology, by locating coordinates and size of the receipt area and of the address area based on the known symbol location of the symbol when the processed symbol has said symbology.

15. The method of claim 14, and uploading the coordinates and the size of the receipt area and of the address area relative to the known symbol location prior to data capture.

16. The method of claim 10, and uploading a predetermined order of processing the return light captured by the imager from the plurality of data areas prior to data capture.

17. The method of claim 10, wherein the actuating step is performed manually in a single manual action.

* * * * *